(12) United States Patent
Mangiaracina

(10) Patent No.: US 11,390,155 B2
(45) Date of Patent: Jul. 19, 2022

(54) TRANSMISSION FOR AGRICULTURAL AND INDUSTRIAL VEHICLES

(71) Applicant: CARRARO S.P.A., Campodarsego (IT)

(72) Inventor: Enrico Mangiaracina, Padua (IT)

(73) Assignee: CARRARO S.P.A., Campodarsego (IT)

( * ) Notice: Subject to any disclaimer, the term of this patent is extended or adjusted under 35 U.S.C. 154(b) by 0 days.

(21) Appl. No.: 17/257,487

(22) PCT Filed: Jul. 3, 2019

(86) PCT No.: PCT/IB2019/055690
§ 371 (c)(1),
(2) Date: Dec. 31, 2020

(87) PCT Pub. No.: WO2020/008395
PCT Pub. Date: Jan. 9, 2020

(65) Prior Publication Data
US 2021/0300170 A1    Sep. 30, 2021

(30) Foreign Application Priority Data
Jul. 3, 2018 (IT) .......................... 102018000006894

(51) Int. Cl.
*B60K 6/365* (2007.10)
*B60K 6/387* (2007.10)
(Continued)

(52) U.S. Cl.
CPC .............. *B60K 6/365* (2013.01); *B60K 6/387* (2013.01); *B60K 6/445* (2013.01);
(Continued)

(58) Field of Classification Search
None
See application file for complete search history.

(56) References Cited

U.S. PATENT DOCUMENTS 5,730,676 A * 3/1998 Schmidt ................. B60K 6/445
475/5
6,592,484 B1 7/2003 Tsai
(Continued)

FOREIGN PATENT DOCUMENTS

| DE | 102014226708 | | 6/2016 | |
|---|---|---|---|---|
| DE | 102014226708 A1 * | 6/2016 | ............. B60K 6/547 |
| DE | 102017220666 A1 * | 6/2018 | ............. B60K 6/365 |

OTHER PUBLICATIONS

International Search Report dated Sep. 10, 2019 received in counterpart International Application No. PCT/IB2019/055690.

*Primary Examiner* — Dirk Wright
(74) *Attorney, Agent, or Firm* — Stradley Ronon Stevens & Young, LLP

(57) ABSTRACT

A transmission for vehicles with hybrid propulsion systems. In particular agricultural or industrial vehicles, wherein the propulsion system comprises a motor of the non-regenerative type, a motor of the regenerative type which is associated with an energy accumulator and with a generator. The transmission includes an input shaft which is connected to the motor of the non-regenerative type and to which the generator is connected, a low-speed shaft and a high-speed shaft which can be selectively coupled to the input shaft by respective clutches, a movement combination device, an output shaft which is connected to the movement combination mechanism, and a blocking element which is configured to block the low-speed shaft or the high-speed shaft.

20 Claims, 8 Drawing Sheets

(51) Int. Cl.
*B60K 6/445* (2007.10)
*B60K 6/38* (2007.10)
*B60K 6/48* (2007.10)

(52) U.S. Cl.
CPC .............................. *B60K 2006/381* (2013.01); *B60K 2006/4841* (2013.01); *B60Y 2200/142* (2013.01); *B60Y 2200/22* (2013.01); *B60Y 2200/92* (2013.01)

(56) References Cited

U.S. PATENT DOCUMENTS

| | | |
|---|---|---|
| 10,442,284 B2 * | 10/2019 | Hao .................. B60K 6/36 |
| 2015/0005126 A1 | 1/2015 | Lee |
| 2015/0183436 A1 | 7/2015 | Rekow |
| 2017/0217298 A1 | 8/2017 | Hao |

\* cited by examiner

TRANSMISSION FOR AGRICULTURAL AND INDUSTRIAL VEHICLES

RELATED APPLICATIONS

The present application is a U.S. national phase application of International Application No. PCT/IB2019/055690 filed on Jul. 3, 2019, which claims the benefit of priority to Italian Patent Application No. 102018000006894, filed on Jul. 3, 2018, the contents of which are incorporated in this application by reference.

TECHNICAL FIELD

The present invention relates to a transmission for vehicles with hybrid propulsion systems, in particular agricultural or industrial vehicles, of the type comprising a motor of the non-regenerative type, a motor of the regenerative type, an energy accumulator and a generator.

BACKGROUND

In the context of the technical field of agricultural and industrial vehicles, there is more widespread the use of hybrid propulsion systems, in which a non-reversible endothermic engine, generally an internal combustion engine, is associated with a reversible motor, of the electric type, which can operate both as a motor and as a generator.

In conventional solutions, the endothermic engine is intended to provide drive power both for the transmission, which is connected to the drive wheels of the vehicle, and to a power take-off (PTO) which allows the supply of power to auxiliary accessories of the vehicle, such as, for example, an agricultural equipment item or a pump for actuating auxiliary hydraulic devices.

Therefore, unlike purely road-based hybrid vehicles, there needs to be different operating modes, which involve specific requirements in the optimum definition of the transmission architecture.

One possible solution for combining the torque supplied by the endothermic engine and that provided by the electric motor is described in DE102014226708A1.

This document describes a gearbox for a motor vehicle, with an input shaft, an output shaft, a first planetary gear set, a second planetary gear set and at least a first shift element, a second shift element and a third switching element, a sun gear of the first planetary gear set is constantly connected with a sun gear of the second planetary gear set and is thus part of a first coupling shaft, with a carrier of the first planetary gear set being permanently connected to a ring gear of the second planetary gear set and thus being part of a second coupling shaft, the input shaft being connectable to a ring gear of the first planetary gear set via the second switching element, the output shaft being directly connected to the second coupling shaft. The transmission has a first electrical machine with a non-rotatable stator and a rotatable rotor, the rotor being connected to the first coupling shaft.

Another possible solution for combining the torque supplied by the endothermic engine and that provided by the electric motor is described in U.S. Patent Application No. 2015/0183436.

This patent application describes a transmission for vehicles which provides for the use of an epicyclic mechanism which receives the movement from the two motors and transmits it, at the output, to a transmission shaft which is connected to the drive wheels of the vehicle.

By blocking the rotation of the ring gear of the epicyclic mechanism, it is possible to vary the kinematic transmission chain of the movement and, for example, obtain entirely electrical propulsion. As detailed in this document, there are some possible charts, which allow the above-mentioned solution to be carried out.

However, some of these designs have a geometry which cannot be readily adapted to the forms and the extents of conventional vehicles, in which the transmission has a main extent in a longitudinal form.

Other variants described in the above-mentioned document, while having a structure which is generally more similar to the conventional transmissions, do not ensure sufficient integration of the motor and generator in the structure of the transmission.

Therefore, the technical problem forming the basis of the present invention is to provide a transmission for hybrid vehicles which allows one or more of the disadvantages mentioned above with reference to the prior art to be overcome.

SUMMARY

This problem is solved by the transmission for vehicles with hybrid propulsion systems described below.

As a result of the solution provided by the present invention, it is possible to obtain a transmission for hybrid propulsion vehicles which is capable of providing different operating modes, with a solution which is particularly simple in construction terms. This solution further provides for the use of a structure which is capable of having a mainly longitudinal extent, thereby being adapted in a suitable manner to conventional vehicles. In this manner, the use of a hybrid propulsion system does not necessarily require a complete reconfiguration of the vehicle with respect to the one used in a vehicle which is supplied only by an internal combustion engine.

The dimensions are further particularly small or in any case optimized for the needs of an industrial vehicle with respect to known solutions.

Preferred features of the invention are further defined in the dependent claims.

According to preferred aspects, the blocking element of the transmission comprises a brake having at least one disc, which is preferably coaxial with respect to the high-speed shaft.

In an embodiment, the low-speed shaft is connected to the movement combination device by an intermediate shaft.

According to a preferred embodiment, the generator is configured also to operate as a motor. Preferably, the motor of the regenerative type is configured also to operate as a generator.

According to another aspect, the sun gears of the two epicyclic mechanisms used in the transmission are coaxial with respect to the motor of the regenerative type.

In an embodiment, the low-speed shaft and/or the high-speed shaft is/are connected to the movement combination mechanism, for example, in the region of the planet gear carrier of an epicyclic mechanism and to the sun gear or the planet gear carrier of the second epicyclic mechanism by respective geared transmission mechanisms having fixed rotation axes which are produced, for example, by gears.

The low-speed shaft and the high-speed shaft are connected to the planet gear carrier and the ring gear by respective geared transmission mechanisms having preferably fixed rotation axes which are produced, for example, by gears.

The output shaft is connected to the planet gear carrier of the second epicyclic mechanism of the movement combination device.

According to another aspect, the low-speed shaft is connected to the planet gear carrier of the first epicyclic mechanism. The high-speed shaft of the transmission is connected to the ring gear of the second epicyclic mechanism. According to a preferred embodiment, the ring gear of the first epicyclic mechanism is directly connected to the planet gear carrier of the second epicyclic mechanism.

According to yet another example, the high-speed shaft of the transmission may be connected to the ring gear of the first epicyclic mechanism. Preferably, the low-speed shaft is connected to the ring gear of the second epicyclic mechanism. According to a preferred embodiment, the planet gear carrier of the first epicyclic mechanism of the movement combination device is directly connected to the planet gear carrier of the second epicyclic mechanism.

It is to be understood that both the foregoing general description and the following detailed description are exemplary, but are not restrictive, of the invention. Other advantages, features and operating methods of the present invention will become evident from the following detailed description of some embodiments, which are set out by way of non-limiting example.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Reference will be made to the Figures of the appended drawings, in which.

DETAILED DESCRIPTION OF THE INVENTION

Figure 1:
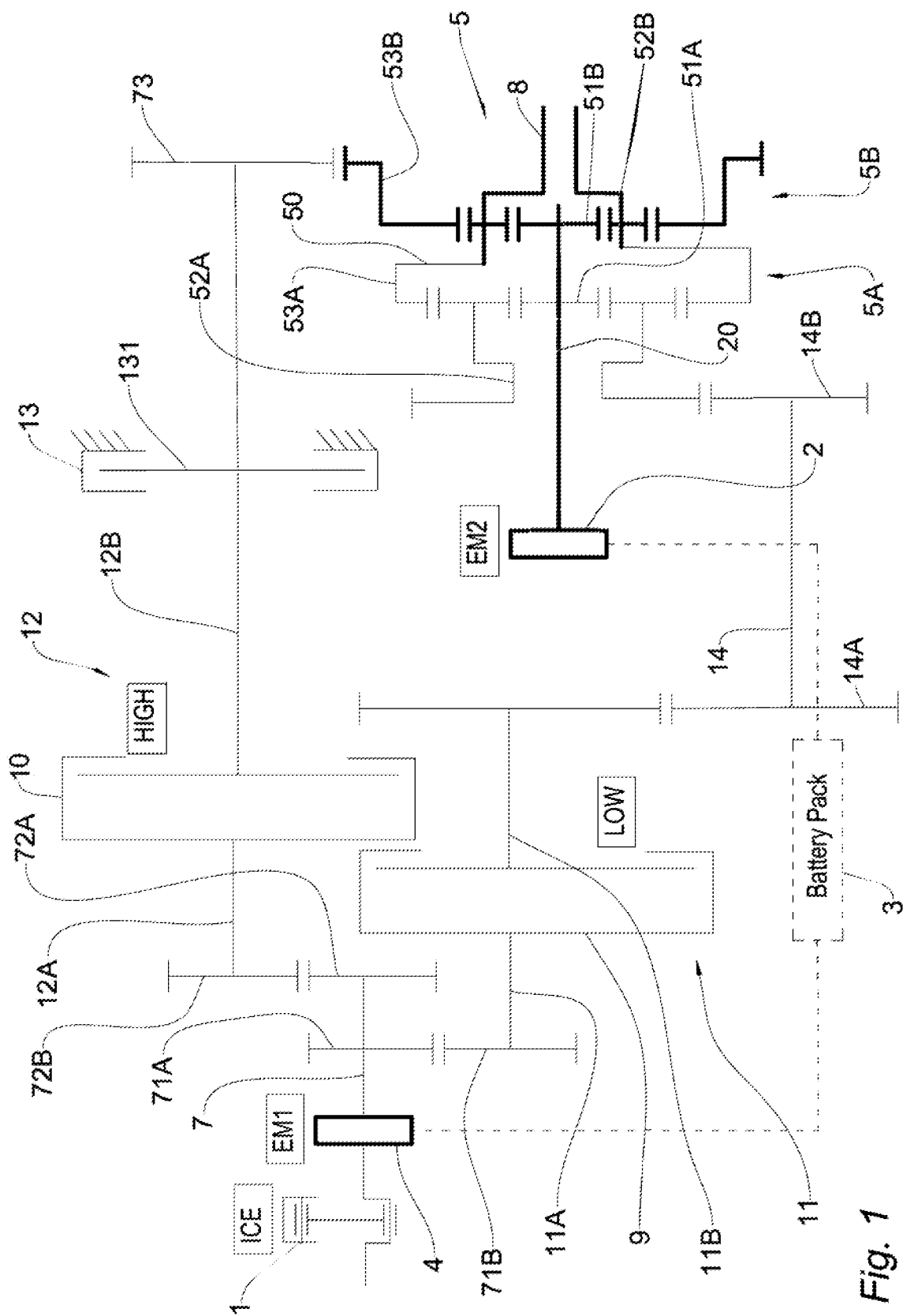
FIG. 1 is a schematic illustration of a transmission according to the present invention.

With reference initially to FIG. 1, one embodiment of a transmission according to the present invention is generally designated with reference number 100.

The transmission according to the present invention is of the type which is intended to be used in vehicles of the agricultural and industrial type with hybrid propulsion systems. In other words, the propulsion system of the vehicle in which the transmission according to the present invention is used comprises a motor 1 of the non-regenerative type, for example, an internal combustion engine, and a motor 2 of the regenerative type, for example, an electric motor.

The motor of the non-regenerative type may be of the reversible type or there may be provided a separate generator with respect to the motor.

In any case, the generator 4, whether it is obtained by causing the motor to operate in this state or it is a separate component, has the objective of recharging an energy accumulator 3 for supplying the non-regenerative motor.

The non-regenerative motor 1 is connected to an input shaft 7 of the transmission.

The generator 4 is further connected to the input shaft 7. The rotor of the generator 4 may be directly supported on the shaft 7 or may receive the movement thereof in an indirect manner, by an intermediate system, which is not illustrated in the Figures.

As will be illustrated better below, the input shaft 7 may be used for directly actuating a power take-off which is connected to the transmission and the positioning of the generator on this shaft is found to be particularly advantageous because it also allows the production of the recharging of the accumulator with a stationary vehicle, during the operations carried out by the power take-off.

According to another aspect of the invention, the generator 4 may also operate as an electric motor so as to allow direct actuation of the shaft 7 and therefore, where applicable, the power take-off may be actuated electrically.

As illustrated in FIG. 1, the input shaft 7 is connected to a low-speed shaft 11 and a high-speed shaft 12 which allow the transmission of the movement to the wheels, with methods which will be described in greater detail below, according to two different transmission ratios.

In an embodiment, the input shaft 7 transmits the movement to the low-speed shaft 11 and the high-speed shaft 12 by respective pairs of gears 71A, 71B, 72A, 72B which are keyed on the shaft 7 itself.

This advantageously allows the arrangement of the low-speed shaft 11 and the high-speed shaft 12 parallel with the input shaft, thereby producing two separate branches, via which the movement and therefore the transmission can be developed.

According to an aspect of the invention, the low-speed shaft 11 and the high-speed shaft 12 can be coupled in a selective manner by using respective clutches 9, 10. In this manner, one of the two shafts may be selected in accordance with the desired operating conditions.

The clutches 9 and 10 are arranged respectively along the low shaft 11 and along the high speed shaft 12, respectively in an intermediate position between the gears 71B, 72B which receive the movement from the input shaft 7 and additional gears 73, 74 which in turn transmit the movement to a movement combination device 5, which is illustrated in detail below.

In an embodiment, the low-speed shaft 11 and the high-speed shaft 12 comprise a respective first portion 11A, 12A and second portion 11B, 12B which are coaxial with each other and which can be coupled to each other by the respective clutches 9, 10.

Figure 2A:
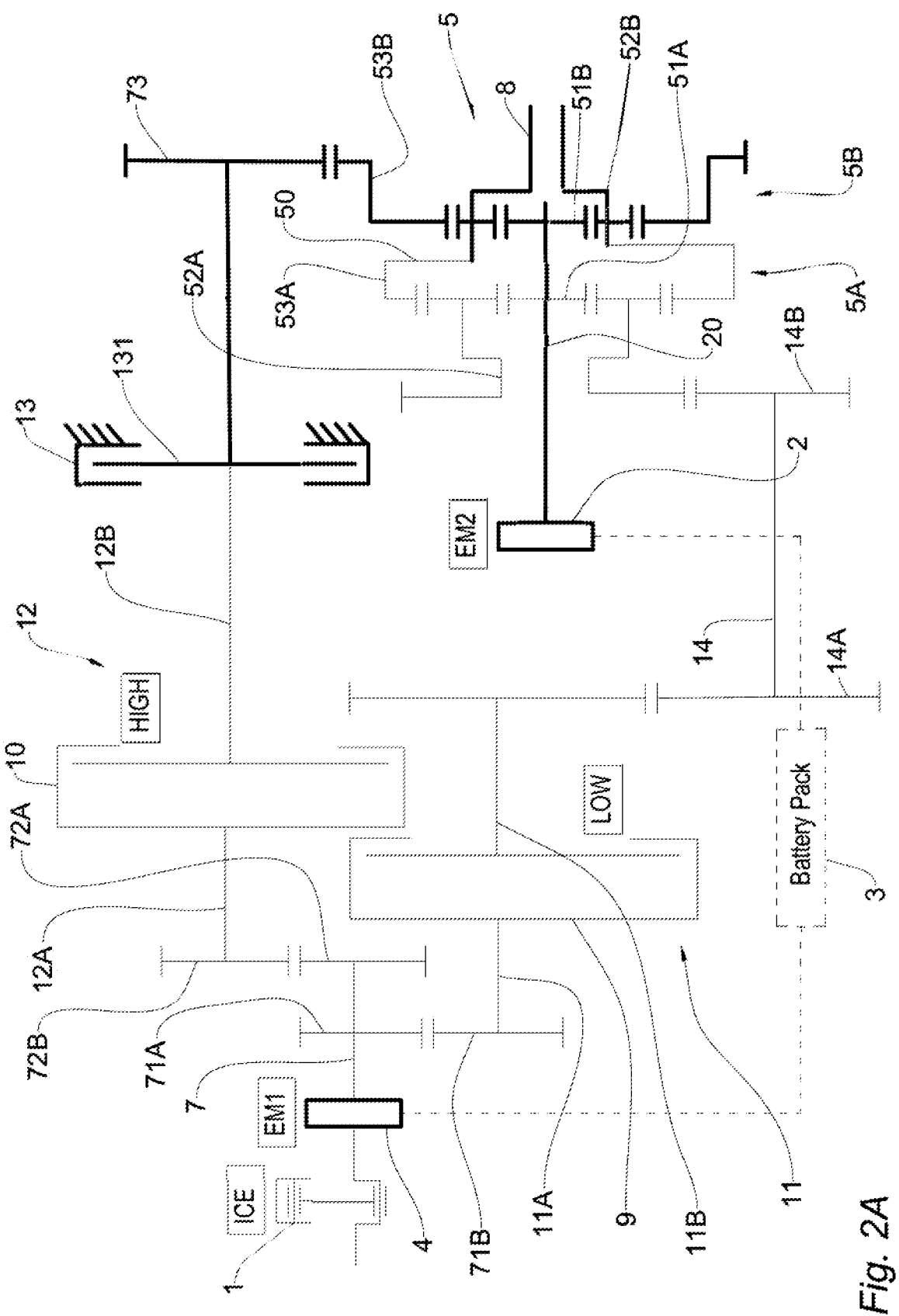
FIG. 2A is a schematic illustration which sets out the movement chain in one operating condition of the transmission.
Figure 2B:
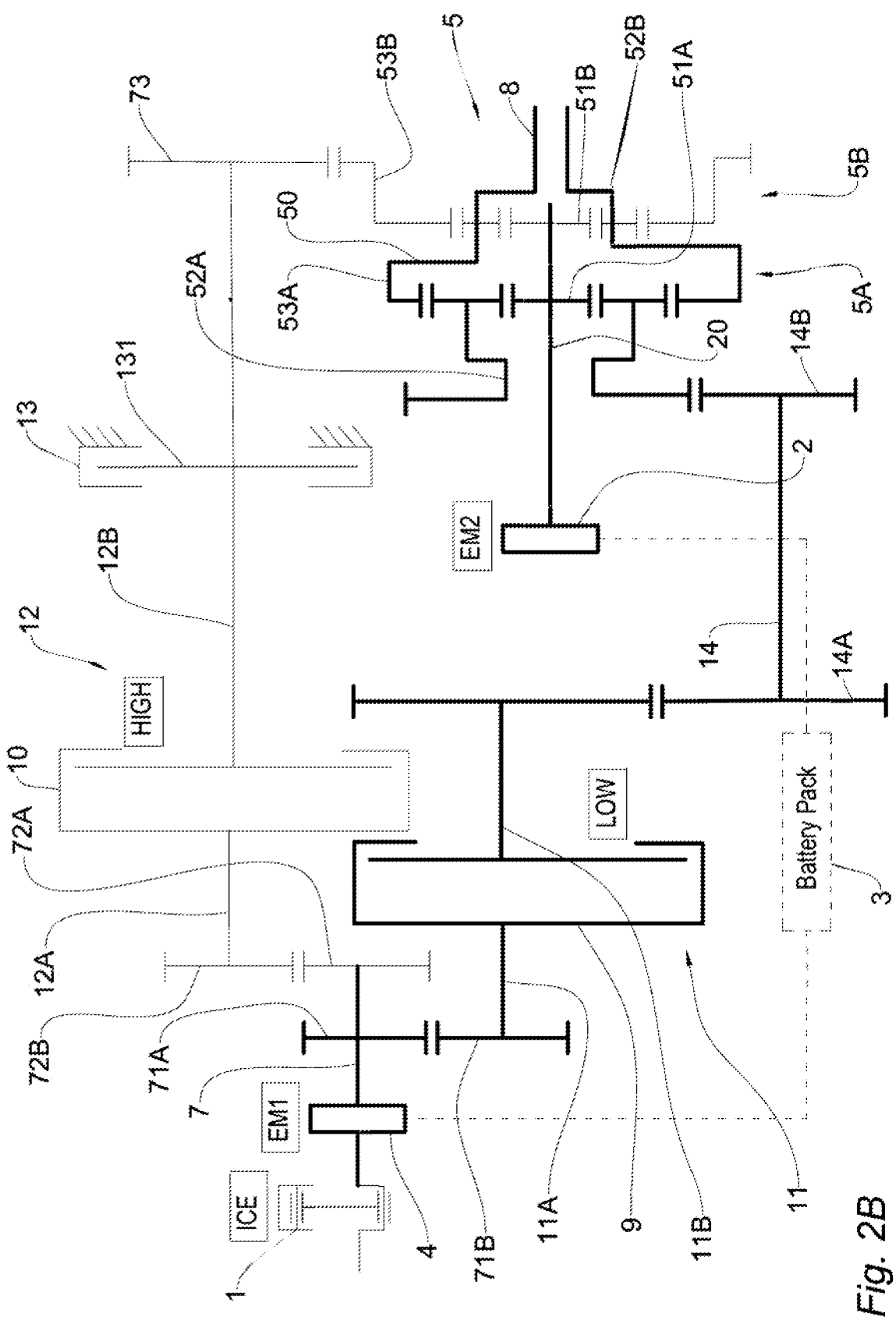
FIG. 2B is a schematic illustration which sets out the movement chain in one operating condition of the transmission.
Figure 2C:
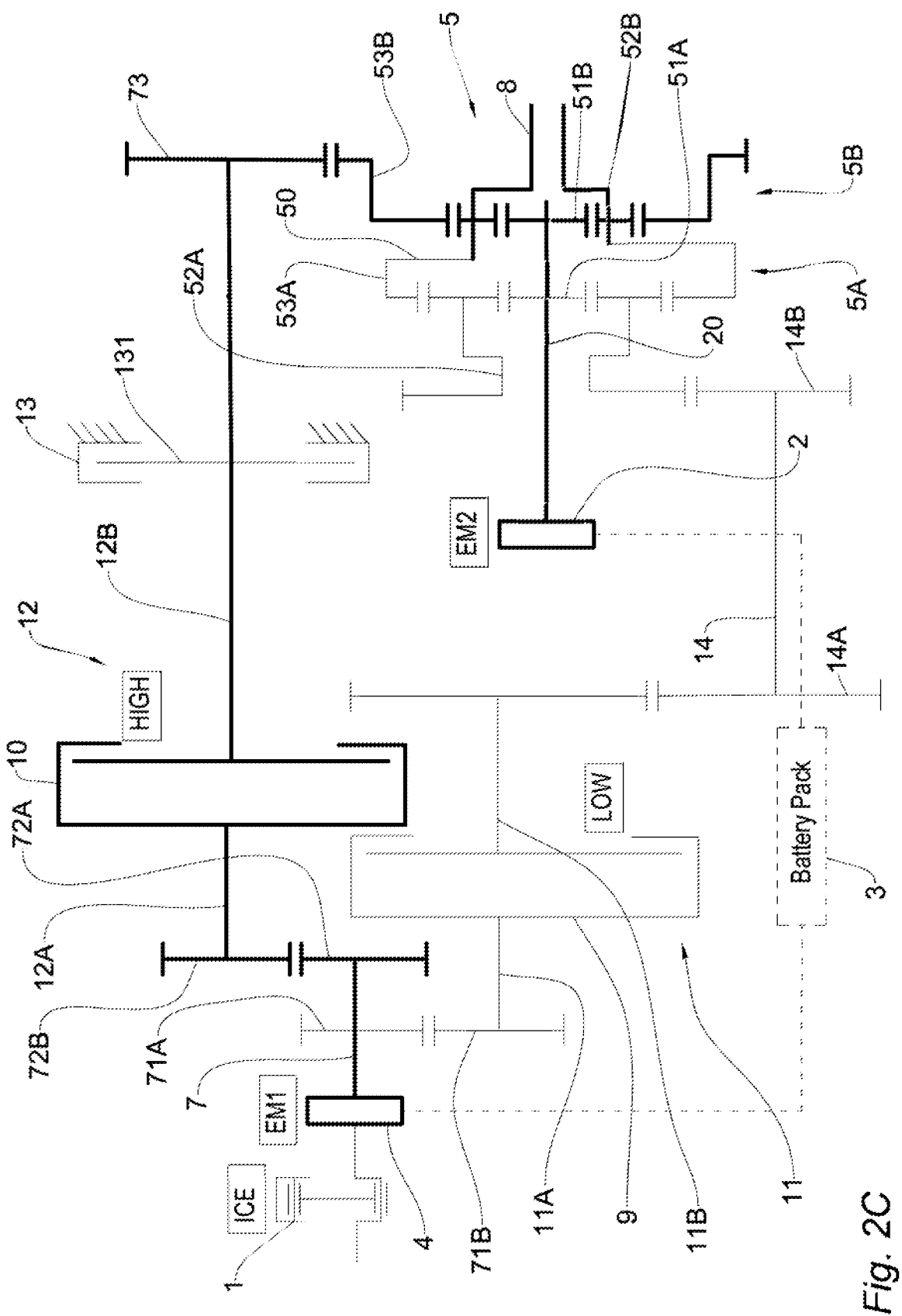
FIG. 2C is a schematic illustration which sets out the movement chain in one operating condition of the transmission.

As can be seen in FIGS. 2B and 2C, when the first clutch 9 is closed, the movement reaches the low-speed shaft via the pairs of gears 71A, 71B and therefore, by an intermediate shaft 14, the movement combination device 5, while, when the second clutch 10 is closed, the movement of the input shaft 7 is transmitted to the high-speed shaft 10 and from this shaft directly to the movement combination device 5.

As will be better described below, these configurations correspond to two separate operating modes of the transmission which are also indicated as second and third operating modes.

Still with reference to FIG. 1, the movement combination device 5 to which the shafts 11 and 12 are connected comprises a first epicyclic mechanism 5A and a second epicyclic mechanism 5B which are connected to each other, in a first embodiment, by a connection between the ring gear 53A of the first mechanism 5A and the planet gear carrier 52B of the second mechanism. In other words, the movement combination device 5 comprises a connection element 50 which joins, by making them rotationally integral each other, the ring gear 53A of the first mechanism 5A and the planet gear carrier 52B of the second mechanism.

The low-speed shaft 11 and the high-speed shaft 12 are connected to the movement combination device 5 which combines the movement thereof according to the method which will be described below.

In an embodiment, the low-speed shaft 11 is connected to the planet gear carrier 52A of the first epicyclic mechanism 5A.

According to a preferred embodiment, the low-speed shaft 11 can be connected directly to the planet gear carrier 52A or indirectly, as in the example of FIG. 1, by the intermediate shaft 14. In this last case, a gear 14A of the intermediate shaft 14 can engage with the gear 74 and a second gear 14B of the shaft 14 engages with a toothed portion of the planet gear carrier 52A.

It may be noted that, in the context of the present invention, an element of the transmission is considered to be connected to another element when there is a synchronous transmission of the movement between the two elements, except for any play between the transmission components of the movement. This generally occurs both in the case of a direct connection and in the case of movement transmission elements with fixed rotation axes are used, in contrast to systems with movable axes, as occurs, for example, in an epicyclic mechanism.

According to a preferred embodiment, the high-speed shaft 12 is connected to the ring gear 53B of the second epicyclic mechanism 5B, by the gear 73 which engages directly with the ring gear 53B.

Therefore, it will be appreciated that, according to an aspect of the invention, the low-speed shaft 11 and the high-speed shaft 12 are connected to the planet gear carrier and to the sun gear of one and the other epicyclic mechanism by respective geared transmission mechanisms with fixed rotation axes.

On the basis of what has been set out above, therefore, it will be appreciated that the low-speed shaft 11 and the high-speed shaft 12 are connected to the planet gear carrier and the ring gear of one and the other epicyclic mechanism by respective geared transmission mechanisms with fixed rotation axes.

The movement combination device 5 further receives movement from the motor 2 of the regenerative type which is connected to both the sun gear 51A of the first mechanism 5A and the sun gear 51B of the second mechanism 5B. In an embodiment, the sun gears 51A and 51B are keyed to the same rotation axle 20 of the motor 2 of the regenerative type.

Therefore, it is evident that, as a result of the above-mentioned configuration, in accordance with the methods with which the low-speed shaft 11, the high-speed shaft 12 and the motor of the regenerative type are caused to rotate, the movement combination device will be capable of obtaining specific conditions of the output by an output shaft 8 of the movement combination mechanism 5 which is typically connected to the wheels of the vehicle, in which the transmission is used. Preferably, the output shaft 8 transmits the movement by additional gears to a gearbox and therefore to the wheels.

In an embodiment, the output shaft 8 is connected to the planet gear carrier 52B of the second epicyclic mechanism 5B.

Advantageously, given that, as a result of the above-mentioned configuration, the output shaft 8 can cause the axle of the motor 2 of the regenerative type to rotate, in one embodiment this may also operate as a generator, also allowing the accumulator 3 to be recharged.

It may also be noted that the above-described configuration allows positioning of the movement combination device 5 in the region of an end of the transmission opposite the end connected to the non-regenerative motor.

The transmission according to the present invention further comprises a blocking element 13 which is configured to block the low-speed shaft 11 or high-speed shaft 12, that is to say, more generally, the input of the movement combination device 5.

In an embodiment, the blocking element 13 comprises a brake which has at least one disc 131 and preferably a disc assembly. Preferably, the brake is keyed to the high-speed shaft 12.

Still in order to obtain a solution which is also as adaptable as possible to non-hybrid propulsion systems, the blocking element is preferably interposed between the relevant clutch and the gear of the shaft on which there is mounted the brake which transmits the movement to the movement combination device 5.

The blocking element 13 allows an additional operating method of the transmission to be obtained.

In fact, when the blocking element 13 is engaged, by blocking the ring gear 53B of the second epicyclic mechanism 5B, as illustrated in FIG. 2A, wherein the kinematic flow is described using a portion with greater thickness, the energy for the movement of the vehicle is supplied from the regenerative motor 2 which is supplied by the accumulator 3. The non-regenerative motor 1 may be turned on and may move the generator 4 which charges the accumulator, or may be turned off. In this second hypothesis, the movement is brought about without emissions and with a low level of noise and may be advantageous in carrying out processing operations inside closed environments.

By unblocking the blocking element 13, it is possible to obtain the other two operating methods which have already been briefly described above.

In the second method, illustrated in FIG. 2B, still using a portion with greater thickness, the clutch 9 of the low-speed shaft 11 is engaged, while the other clutch and the blocking element 13 are not engaged.

The energy supplied by the non-regenerative motor flows partially into the generator 4 for recharging the energy accumulator 3 and partially into the movement combination device 5 in which it is added to the energy supplied by the regenerative motor 2, which is supplied by the energy accumulator 3.

The third operating method is described in FIG. 2C.

In this case, the clutch 10 of the high-speed shaft is engaged while the other clutch 9 and the blocking element 13 are not engaged.

The energy supplied by the non-regenerative motor 1 flows partially into the generator 4 for recharging the energy accumulator 3 and partially into the epicyclic mechanism, in which it is added to the energy supplied by the electric motor, which is supplied by the battery.

In this case, the intermediate shaft and the relevant gear transmission not being present, a transmission ratio which is different from the preceding case is therefore obtained.

Figure 3A:
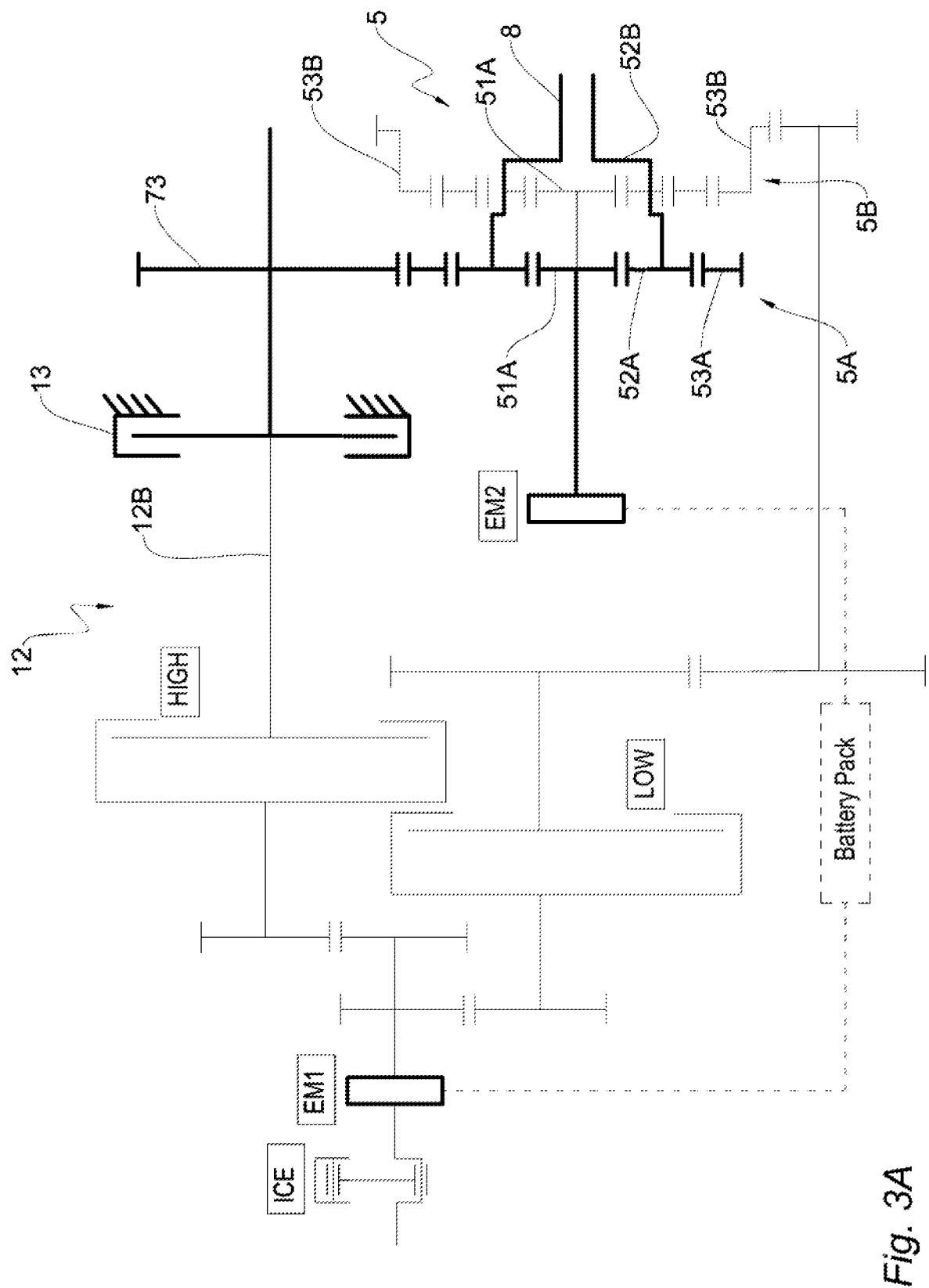
FIG. 3A is a schematic illustration which sets out the movement chain in an operating condition of the transmission according to an alternative embodiment of the present invention.
Figure 3B:
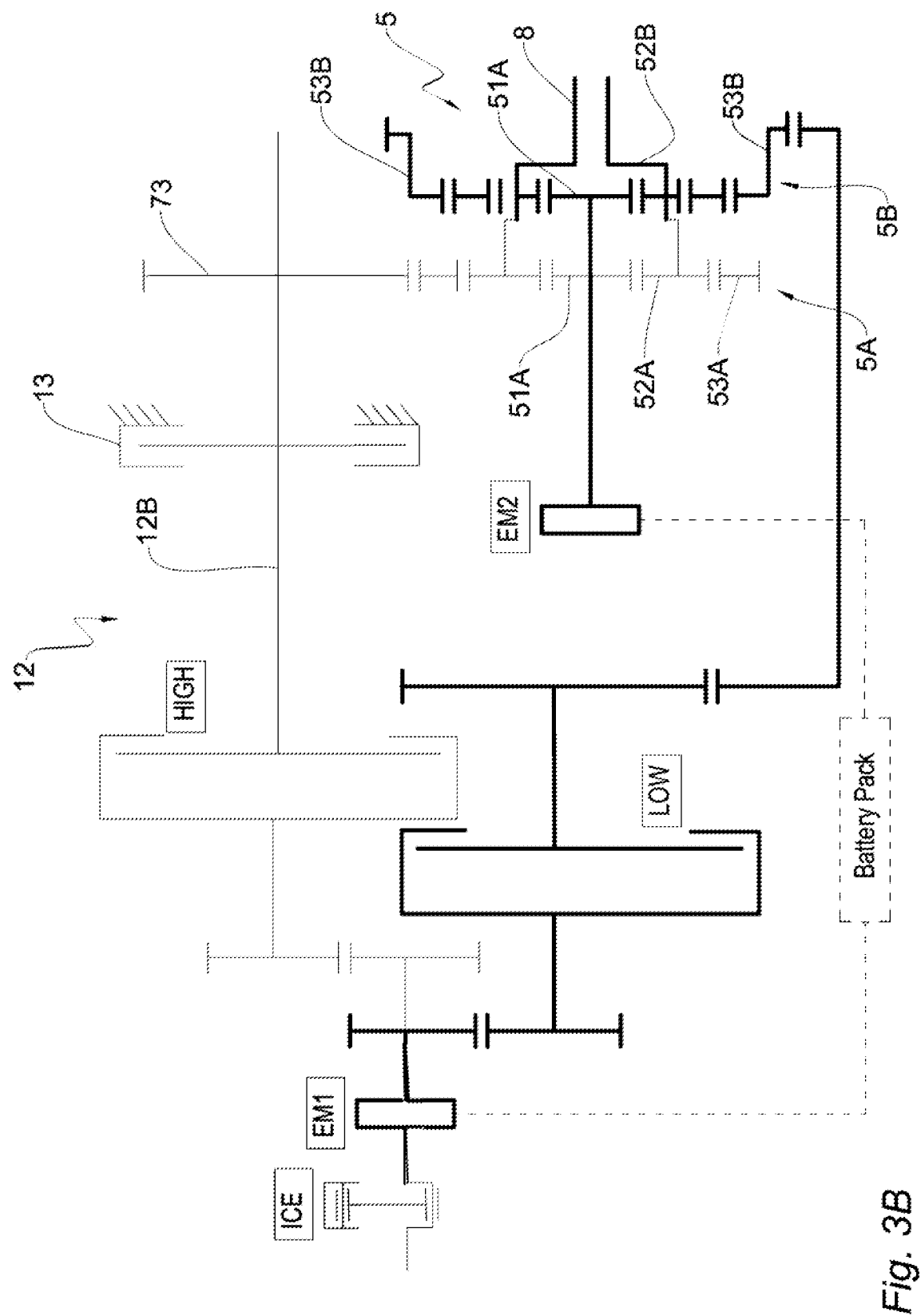
FIG. 3B is a schematic illustration which sets out the movement chain in an operating condition of the transmission according to an alternative embodiment of the present invention.
Figure 3C:
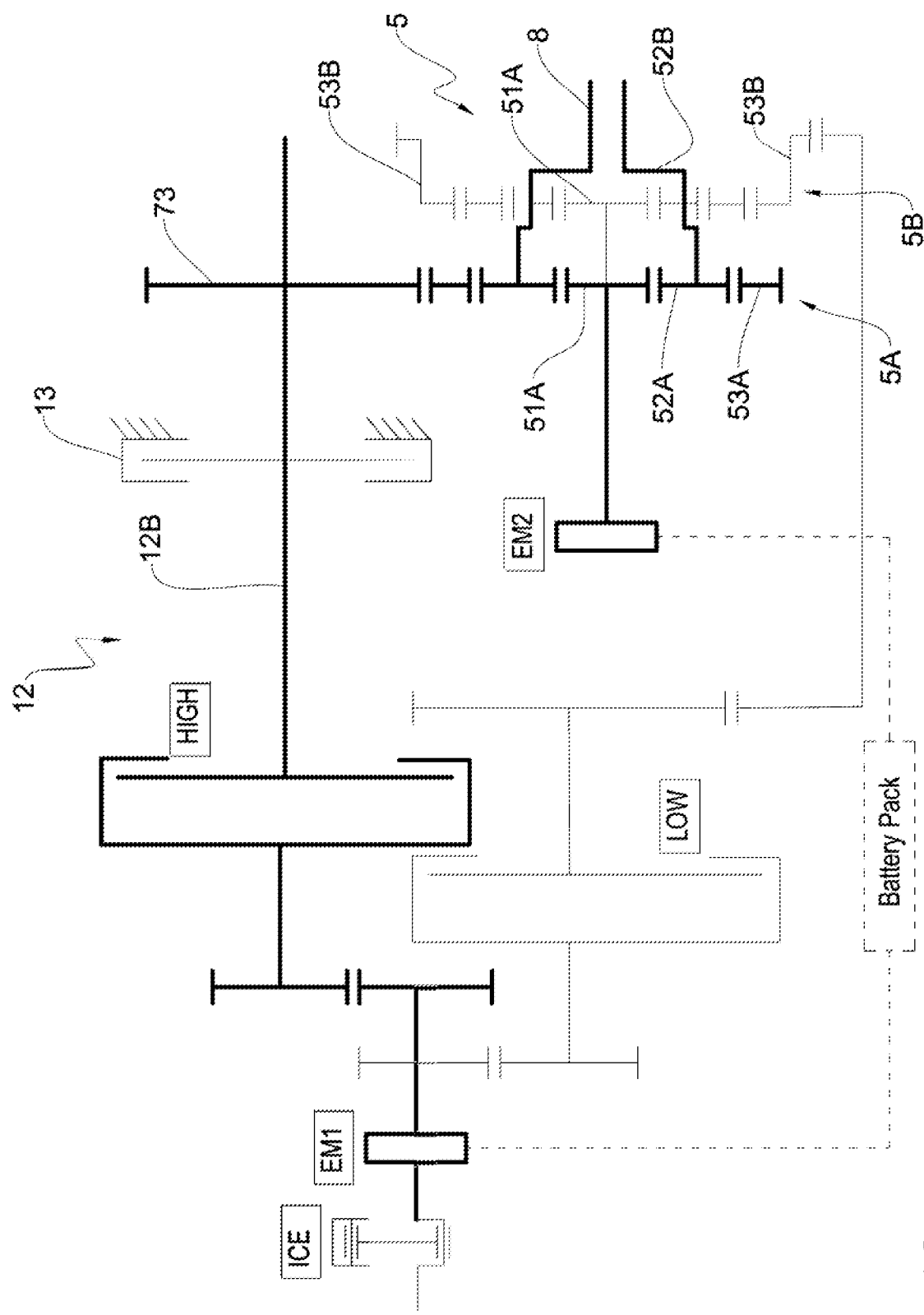
FIG. 3C is a schematic illustration which sets out the movement chain in an operating condition of the transmission according to an alternative embodiment of the present invention.
Figure 4:
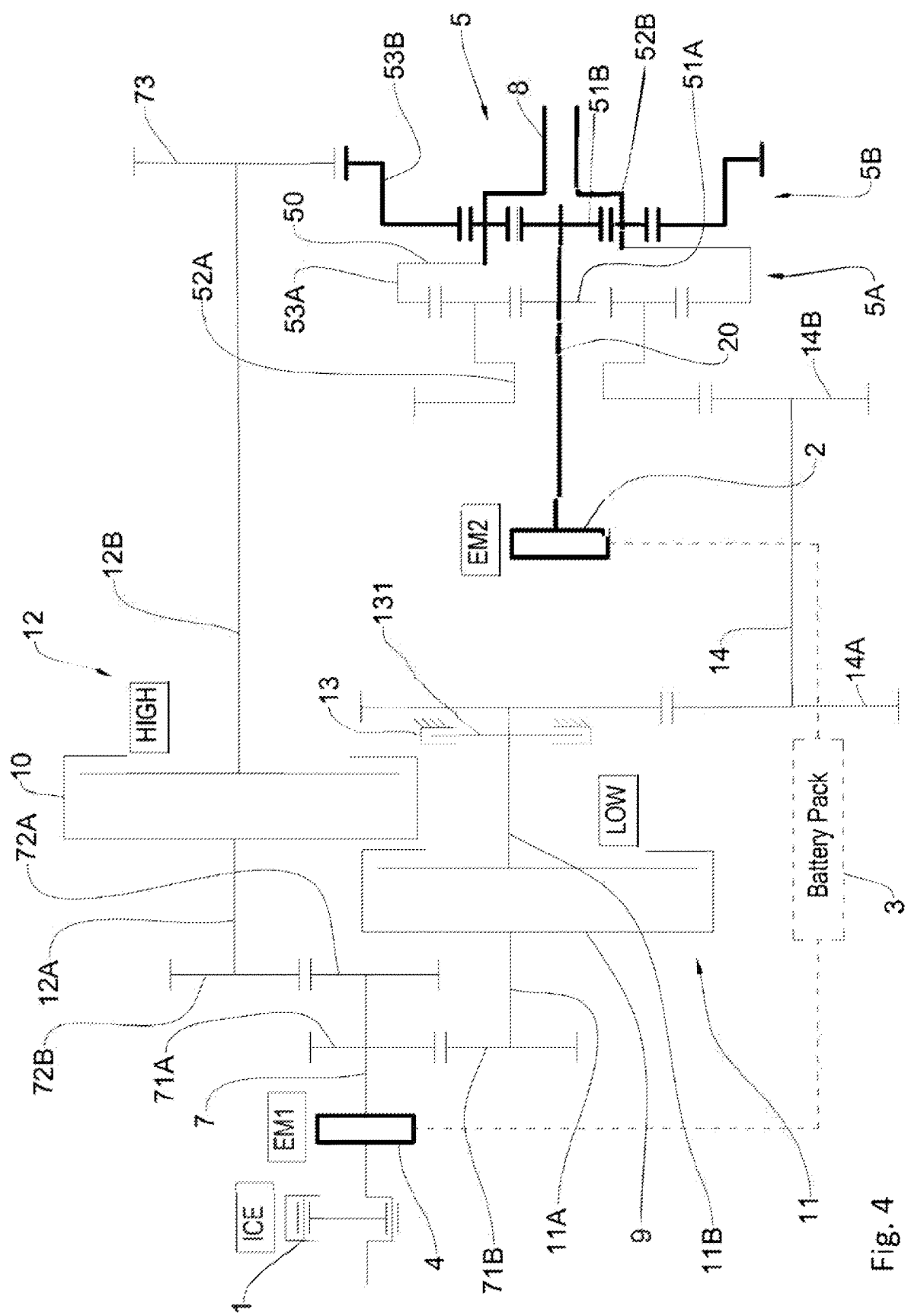
FIG. 4 is a schematic illustration which sets out the movement chain in an operating condition of the transmission according to an alternative embodiment of the present invention.

According to another variant of the invention, which is schematically illustrated in FIGS. 3A to 3C, the high-speed shaft 12 is connected to the ring gear 53A of the first epicyclic mechanism 5A and the low-speed shaft 11 is connected to the ring gear 53B of the second epicyclic mechanism 5B.

Preferably, unlike the first variant, the planet gear carrier 52A of the first epicyclic mechanism 5A is directly connected to the planet gear carrier 52B of the second epicyclic mechanism 5B.

It will be appreciated that all the remaining characteristics described in relation to the preceding embodiment will also be similarly applicable to the one now being described.

Therefore, it is evident that the transmission described solves the problems identified with reference to the present invention, as a result of the architecture used and the different operating possibilities.

The invention claimed is:

1. A transmission for vehicles with hybrid propulsion systems, in particular agricultural or industrial vehicles, wherein the propulsion system has a non-regenerative motor and a regenerative motor which is associated with an energy accumulator and with a generator for recharging the energy accumulator, the transmission comprising:
   an input shaft which is connected to the non-regenerative motor and to which the generator is connected,
   a low-speed shaft and a high-speed shaft which are selectively coupled to the input shaft by respective clutches;
   a movement combination device which comprises a first epicyclic mechanism and a second epicyclic mechanism which comprise respective sun gears, planet gear carriers, and ring gears, in which a planet gear carrier of one of the epicyclic mechanisms is connected to another planet gear carrier or to the ring gear of the other,
   the low-speed shaft and the high-speed shaft being connected to the movement combination device, so that the low-speed shaft is connected to the planet gear carrier of the first epicyclic mechanism and the high-speed shaft is connected to the ring gear of the second epicyclic mechanism or, alternatively, so that the low-speed shaft is connected to the ring gear of the second epicyclic mechanism and the high-speed shaft is connected to the ring gear of the first epicyclic mechanism,
   an output shaft which is connected to the movement combination device,
   a blocking element which is configured to block the low-speed shaft or the high-speed shaft, and
   wherein the regenerative motor is connected to the sun gears of the first epicyclic mechanism and the second epicyclic mechanism the input shaft transmits movement to the low-speed shaft and to the high-speed shaft by respective pairs of gears, the low-speed shaft and the high-speed shaft are parallel with the input shaft, the clutches are arranged respectively along the low speed shaft and along the high speed shaft, respectively in an intermediate position between gears that receive movement from the input shaft and additional gears which in turn transmit movement to the movement combination device, the high-speed shaft is connected to the ring gear of the second epicyclic mechanism by one gear of the additional gears which engages directly with the ring gear, the low-speed shaft is connected to the movement combination device by an intermediate shaft comprising a gear that engages with the other gear of said additional gears and a second gear that engages with a toothed portion of the planet gear carrier of the first epicyclic mechanism.

2. The transmission of claim 1, wherein the blocking element comprises a brake having at least one disc which is coaxial with respect to the high-speed shaft.

3. The transmission of claim 1, wherein the generator is configured to also operate as a motor and the regenerative motor is configured to also operate as a generator.

4. The transmission of claim 1, wherein the sun gears are coaxial with respect to the regenerative motor.

5. The transmission of claim 1, wherein the respective pairs of gears, connecting the input shaft to the low-speed shaft and to the high-speed shaft, have fixed rotation axes.

6. The transmission of claim 1, wherein the low-speed shaft and the high-speed shaft are connected to the planet gear carrier and the ring gear by respective geared transmission mechanisms having fixed rotation axes.

7. The transmission of claim 1, wherein the low-speed shaft and the high-speed shaft comprise a respective first portion and second portion, the first and second portions being coaxial with respect to each other and able to be coupled to each other by the clutches.

8. The transmission of claim 1, wherein the output shaft is connected to the planet gear carrier of the second epicyclic mechanism.

9. The transmission of claim 1, wherein the ring gear of the first epicyclic mechanism is directly connected to the planet gear carrier of the second epicyclic mechanism.

10. The transmission of claim 1, wherein the high-speed shaft is connected to the ring gear of the first epicyclic mechanism and the low-speed shaft is connected to the ring gear of the second epicyclic mechanism, the planet gear carrier of the first epicyclic mechanism being directly connected to the planet gear carrier of the second epicyclic mechanism.

11. A transmission for vehicles with hybrid propulsion systems, in particular agricultural or industrial vehicles, wherein the propulsion system has a non-regenerative motor and a regenerative motor which is associated with an energy accumulator and with a generator for recharging the energy accumulator, the transmission comprising:
   an input shaft which is connected to the non-regenerative motor and to which the generator is connected,
   a low-speed shaft and a high-speed shaft which are selectively coupled to the input shaft by respective clutches;
   a movement combination device which comprises a first epicyclic mechanism and a second epicyclic mechanism which comprise respective sun gears, planet gear carriers, and ring gears, in which a planet gear carrier of one of the epicyclic mechanisms is connected to another planet gear carrier or to the ring gear of the other,
   the low-speed shaft and the high-speed shaft being connected to the movement combination device, so that the low-speed shaft is connected to the planet gear carrier of the first epicyclic mechanism and the high-speed shaft is connected to the ring gear of the second epicyclic mechanism or, alternatively, so that the low-speed shaft is connected to the ring gear of the second epicyclic mechanism and the high-speed shaft is connected to the ring gear of the first epicyclic mechanism, an output shaft which is connected to the movement combination device, a blocking element which is configured to block the low-speed shaft or the high-speed shaft, and wherein the regenerative motor is connected to the sun gears of the first epicyclic mechanism and the second epicyclic mechanism the input shaft transmits movement to the low-speed shaft and to the high-speed shaft by respective pairs of gears, the low-speed shaft and the high-speed shaft are parallel with the input shaft, the clutches are arranged respectively along the low speed shaft and along the high speed shaft, respectively in an intermediate position between gears that receive movement from the input shaft and additional gears which in turn transmit movement to the movement combination device, the high-speed shaft is connected to the ring gear of the second epicyclic mechanism by one gear of the additional gears which engages directly with the ring gear, the low-speed shaft is connected to the movement combination device by an intermediate shaft comprising a gear that engages with the other gear of said additional gears and a second gear that engages with a toothed portion of the planet gear carrier of the first epicyclic mechanism and the sun gears are coaxial with respect to the regenerative motor.

12. The transmission of claim 11, wherein the low-speed shaft and the high-speed shaft are connected to the planet gear carrier and to the sun gear by a respective geared transmission mechanisms having fixed rotation axes.

13. The transmission of claim 11, wherein the blocking element comprises a brake having at least one disc which is coaxial with respect to the high-speed shaft.

14. The transmission of claim 11, wherein the generator is configured to also operate as a motor and the regenerative motor is configured to also operate as a generator.

15. The transmission of claim 11, wherein the respective pairs of gears, connecting the input shaft to the low-speed shaft and to the high-speed shaft, have fixed rotation axes.

16. The transmission of claim 11, wherein the low-speed shaft and the high-speed shaft are connected to the planet gear carrier and the ring gear by respective geared transmission mechanisms having fixed rotation axes.

17. The transmission of claim 11, wherein the low-speed shaft and the high-speed shaft comprise a respective first portion and second portion, the first and second portions being coaxial with respect to each other and able to be coupled to each other by the clutches.

18. The transmission of claim 11, wherein the output shaft is connected to the planet gear carrier of the second epicyclic mechanism.

19. The transmission of claim 11, wherein the ring gear of the first epicyclic mechanism is directly connected to the planet gear carrier of the second epicyclic mechanism.

20. A transmission for vehicles with hybrid propulsion systems, in particular agricultural or industrial vehicles, wherein the propulsion system has a non-regenerative motor and a regenerative motor which is associated with an energy accumulator and with a generator for recharging the energy accumulator, transmission comprising:

an input shaft which is connected to the non-regenerative motor and to which the generator is connected, a low-speed shaft and a high-speed shaft which are selectively coupled to the input shaft by respective clutches;

a movement combination device which comprises a first epicyclic mechanism and a second epicyclic mechanism which comprise respective sun gears, planet gear carriers, and ring gears, in which a planet gear carrier of one of the epicyclic mechanisms is connected to another planet gear carrier or to the ring gear of the other, the low-speed shaft and the high-speed shaft being connected to the movement combination device, so that the low-speed shaft is connected to the planet gear carrier of the first epicyclic mechanism and the high-speed shaft is connected to the ring gear of the second epicyclic mechanism or, alternatively, so that the low-speed shaft is connected to the ring gear of the second epicyclic mechanism and the high-speed shaft is connected to the ring gear of the first epicyclic mechanism, an output shaft which is connected to the movement combination device, a blocking element which is configured to block the low-speed shaft or the high-speed shaft, and wherein the regenerative motor is connected to the sun gears of the first epicyclic mechanism and the second epicyclic mechanism the input shaft transmits movement to the low-speed shaft and to the high-speed shaft by means of respective pairs of gears, the low-speed shaft and the high-speed shaft are parallel with the input shaft, the clutches are arranged respectively along the low speed shaft and along the high speed shaft, respectively in an intermediate position between gears that receive movement from the input shaft and additional gears which in turn transmit movement to the movement combination device, the high-speed shaft is connected to the ring gear of the second epicyclic mechanism by one gear of the additional gears which engages directly with the ring gear, the low-speed shaft is connected to the movement combination device by an intermediate shaft comprising a gear that engages with the other gear of said additional gears and a second gear that engages with a toothed portion of the planet gear carrier of the first epicyclic mechanism and the sun gears are coaxial with respect to the regenerative motor, the low-speed shaft and the high-speed shaft are connected to the planet gear carrier and to the sun gear by a respective geared transmission mechanisms having fixed rotation axes, the blocking element comprises a brake having at least one disc which is coaxial with respect to the high-speed shaft, the generator is configured to also operate as a motor and the regenerative motor is configured to also operate as a generator, and the low-speed shaft and the high-speed shaft comprise a respective first portion and second portion, the first and second portions being coaxial with respect to each other and able to be coupled to each other by the clutches.

* * * * *